United States Patent [19]
Yore, Jr.

[11] Patent Number: 5,611,150
[45] Date of Patent: Mar. 18, 1997

[54] CENTRIFUGAL PELLET DRYER

[75] Inventor: Robert G. Yore, Jr., Midland, Mich.

[73] Assignee: The Conair Group, Inc., Pittsburgh, Pa.

[21] Appl. No.: 652,300

[22] Filed: May 23, 1996

[51] Int. Cl.$^6$ ............................................. F26B 17/24
[52] U.S. Cl. ........................... 34/58; 34/59; 34/128; 34/147; 34/166; 34/167
[58] Field of Search .................... 34/58, 59, 127, 34/128, 129, 142, 147, 166, 173, 179, 182, 183

[56] References Cited

U.S. PATENT DOCUMENTS

| | | | |
|---|---|---|---|
| 3,581,407 | 6/1971 | Ward et al. | 34/166 |
| 3,627,138 | 12/1971 | Peck | 210/238 |
| 4,130,944 | 12/1978 | Hultsch et al. | 34/58 |
| 4,371,382 | 2/1983 | Ross | 210/788 |
| 4,461,093 | 7/1984 | Hultsch et al. | 34/58 |
| 4,691,448 | 9/1987 | Alstetter et al. | 34/58 |
| 4,896,435 | 1/1990 | Spangler, Jr. | 34/58 |
| 5,265,347 | 11/1993 | Woodson et al. | 34/58 |

*Primary Examiner*—John M. Sollecito
*Assistant Examiner*—Steve Gravini
*Attorney, Agent, or Firm*—Buchanan Ingersoll, P.C.; George Raynovich, Jr.

[57] ABSTRACT

A centrifugal pellet dryer is provided which has a housing, a generally cylindrical mesh member vertically disposed within the housing and a rotor that is coaxial with the mesh member. The rotor has lifters which tend to move a slurry of pellets and water upwardly and outwardly relative to the cylindrical mesh member so that water moving radially through the mesh member is separated from the pellets which are retained by the mesh member. The rotor has a hollow interior portion that communicates with the bottom of the rotor so that the slurry of pellets of water are introduced into the dryer through the hollow interior of the rotating rotor. The slurry of pellets and water is distributed uniformly about the periphery of the mesh member by the rotating rotor and the rotation of the rotor enhances the centrifugal force of the slurry to initially dewater the slurry more effectively as the water moves radially outwardly through the mesh member.

10 Claims, 2 Drawing Sheets

CENTRIFUGAL PELLET DRYER

BACKGROUND OF THE INVENTION

1. Field of the Invention

This invention relates to centrifugal pellet dryers that are utilized to dry plastic pellets that have been cut from strands of plastic in a pelletizer. A water slurry of plastic pellets is introduced into the dryer where the pellets are separated from the water. The dry pellets can then be conveyed to a shipping container or to a location to be reprocessed.

2. Description of the Prior Art.

Centrifugal pellet dryers are well known in the art. Examples of centrifugal pellet dryers appear in U.S. Pat. No. 4,896,435 issued Jan. 30, 1990 and in U.S. Pat. No. 5,265,347 issued Nov. 30, 1993. In these patented pellet dryers, a slurry of pellets and water is introduced into the bottom of the dryer and a rotor carries the pellets and water upwardly through the dryer as the water is forced outwardly by centrifugal force through a cylindrical screen that surrounds the rotor. The pellets are removed near the top of the cylindrical screen and the water is drained from the bottom of the dryer housing.

In the above-described centrifugal pellet dryers and in earlier centrifugal pellet dryers, the slurry of pellets and water is introduced between the rotor and the cylindrical screen so that the rotor breaks the stream of the slurry where it is introduced and a large portion of the pellets is deposited on the screen near the entry port of the slurry stream.

In the present invention, the slurry stream of pellets and water is introduced through the rotor of the centrifugal dryer into the interior of the cylindrical screen or mesh member. By introducing the pellets and water through the rotor as the rotor rotates, the pellets and water are evenly distributed about the interior of the cylindrical screen or mesh member as opposed to a bottom feed where most of the initial dewatering is done in the first quadrant adjacent to the slurry inlet which loads up the screen and limits its effectiveness in the initial dewatering stage. The feed of the slurry through the rotor minimizes radial bearing loads that are present in the prior an since the lifter blades in the prior art must break the stream of water and pellets in one location that is off center from the rotor axis. The feed of the slurry through the rotor also enhances the centrifugal force of the rotor to force the water radially through the screen to thereby enhance the initial dewatering stage of the dryer.

SUMMARY OF THE INVENTION

In accordance with present invention, there is provided a centrifugal pellet dryer that has an outer housing with a water removal port formed in the outer housing. A generally cylindrical mesh member is disposed vertically within the outer housing. The mesh member is formed of material that permits passage of water through it but prevents the passage of pellets through it. A vertically disposed rotor with lifters affixed to it is journaled for rotation coaxially with the general cylindrical mesh member to direct pellets upwardly within the mesh member to a pellet exit port formed in the mesh member. The rotor has a cylindrical hollow interior portion coaxial with the rotor and a plurality of radial passages extending between the rotor cylindrical hollow interior portion and the rotor outer surface. A slurry inlet receives a slurry of pellets and water. The slurry inlet is located on the bottom of the rotor and communicates with the slurry cylindrical hollow interior portion whereby slurry entering the slurry inlet is conducted through the rotor cylindrical hollow interior portion, through the plurality of radial passages and into a space between the rotor outer surface and the generally cylindrical mesh member.

Accordingly, an object of the present invention is to provide an improved centrifugal pellet dryer.

Another object of the present invention is to provide a centrifugal pellet dryer in which the water-pellet slurry entering the dryer is fed through the rotor of the dryer.

These and other objects of the present invention will be more completely disclosed and described in the following specification, the accompanying drawings and the appended claims.

DESCRIPTION OF THE PREFERRED EMBODIMENT

Figure 1:
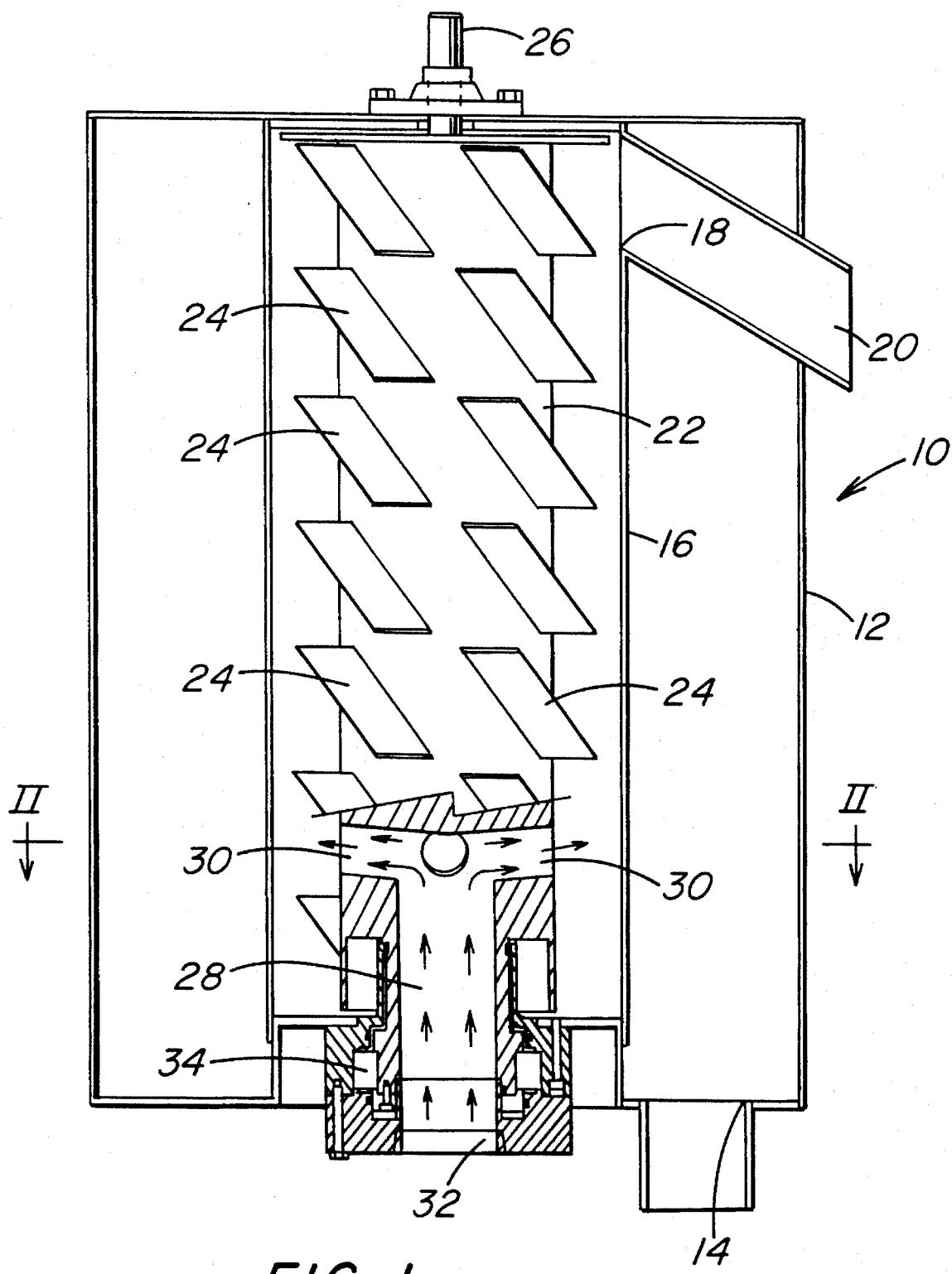
FIG. 1 is a sectional elevation of the centrifugal pellet dryer of the present invention taken along line I—I of FIG. 2.

Referring to the drawings, there is shown a centrifugal pellet dryer 10 having an outer housing 12 with a water outlet port 14. A generally cylindrical mesh member or screen 16 is positioned vertically within the housing 12 and the mesh member 16 has a pellet exit port 18 formed near the top of the mesh member 16. The pellet exit port 18 is connected to a pellet conduit 20 to convey dried pellets from the centrifugal pellet dryer 10. The mesh member 16 is formed of material such as screening or perforated metal which permits water to pass through the mesh member 16 but prevents pellets from passing through the mesh member 16.

Figure 2:
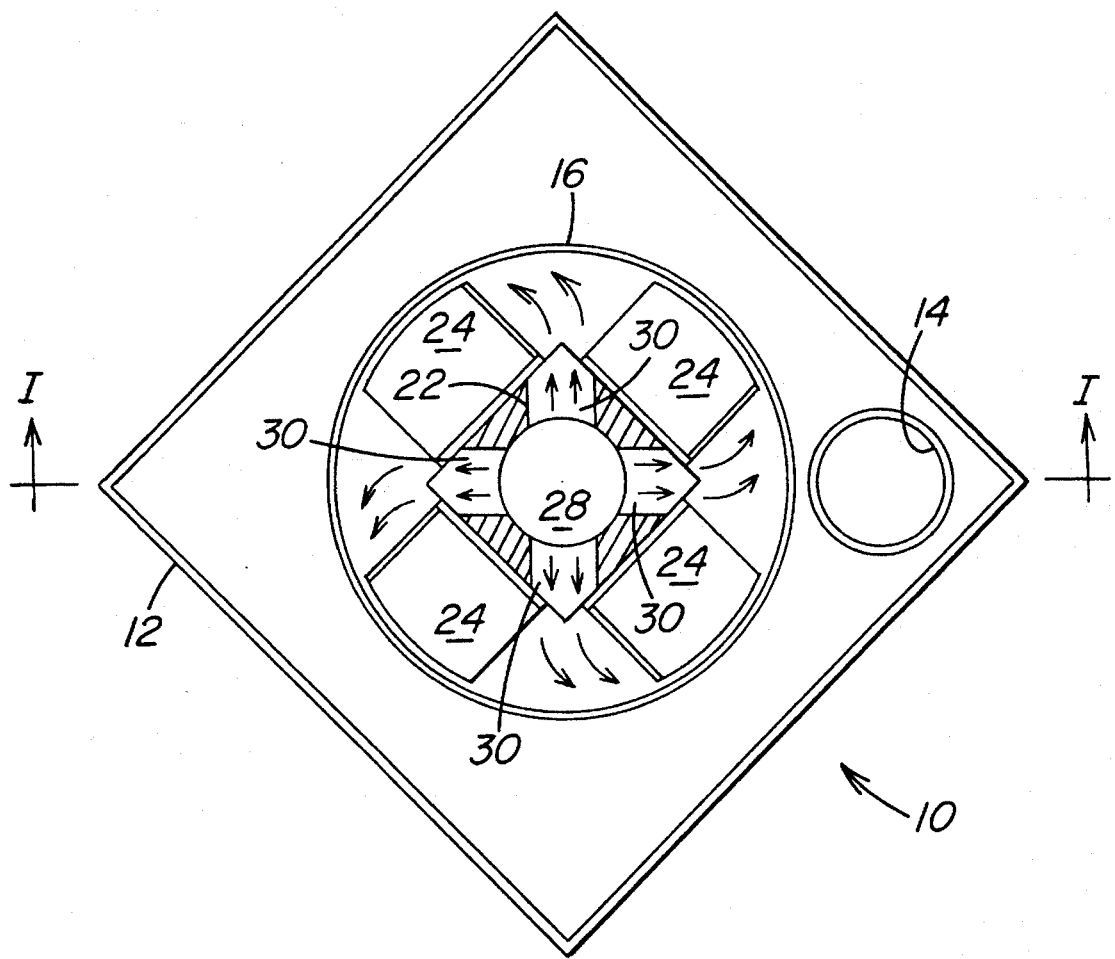
FIG. 2 is a top plan sectional view taken along line II—II of FIG. 1.

As best seen in FIG. 2, the outer housing 12 has the mesh member 16 generally centered within the housing 12. The housing 12 may have doors (not shown) to achieve access to the interior of the housing 12 as is conventional with centrifugal pellet dryers but which form no part of the present invention. In like manner, the mesh member 16 may be formed in halves or in sections to facilitate cleaning of the screen as is conventional in centrifugal pellet dryers but which forms no part of the present invention.

A rotor 22 has a plurality of lifters 24 affixed to the outer surfaces of the rotor 22 so that as the rotor 22 rotates, the lifters 24 tend to force the slurry and water upwardly and outwardly through the mesh member 16 so that the water exits through the mesh member 16 and the pellets continue upwardly through pellet exit port 18.

A drive shaft 26 is affixed to rotor 22 at the upper end of rotor 22 and is journaled for rotation relative to housing 12. At the lower portion of rotor 22, a hollow interior portion 28 is formed in the rotor 22. The hollow interior portion 28 of rotor 22 is cylindrical in cross-section (FIG. 2) and extends to the bottom of the rotor 22. Near the top of the hollow interior portion 28, four radially extending passages 30 communicate with the hollow interior portion 28 of rotor 22 and with the outer surface of rotor 22.

A slurry inlet 32 is formed on housing 12 and communicates with the hollow interior portion 28 of rotor 22. A lower bearing 34 journals the lower portion of rotor 22 for rotation relative to the housing 12.

In operation, the slurry of pellets and water enters the slurry inlet 32, passes upwardly through the hollow interior portion 28 of rotor 22 as indicated by the arrows in FIG. 1, and thereafter is thrown outwardly through radially extending passages 30, as indicated by the arrows in FIGS. 1 and 2, into the space between the rotor 22 and the interior of mesh member 16. Because the rotor 22 is turning, the slurry is distributed evenly around mesh member 16 and the lifters 24 lift the slurry and cause it to move upwardly and outwardly relative to the mesh member 16. As the water exits through mesh member 16, it is collected within the housing 12 and drained through water outlet 14 from the housing. The dried pellets move upwardly under the influence of the rotating rotor 22 and lifters 24 until the dried pellets exit the pellet exit port 18 in mesh member 16 and pass into the pellet conduit 20.

Because the initial distribution of the slurry is uniform around the periphery of mesh member 16, there is no side loading on the lower bearing 34 nor on the upper bearing (not shown) which journals the drive shaft 26 at the upper end of housing 12.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. In a centrifugal pellet dryer having an outer housing, a generally cylindrical mesh member disposed vertically within said outer housing, said mesh member permitting water to pass through it but preventing the passage of pellets through it, a vertically disposed rotor with lifters affixed thereto for rotating axially within said generally cylindrical mesh member to direct pellets upwardly to a pellet exit port in said mesh member, and a water removal port in said outer housing, the improvement comprising:

said rotor having a hollow interior portion;

radially extending passages within said rotor connecting said rotor hollow interior portion to a space between said rotor and said mesh member;

said rotor being utilized to introduce a slurry of water and pellets into said space between said rotor and said mesh member through said rotor hollow interior portion and said radially extending passages.

2. The improvement of claim 1 wherein said rotor has a rotor drive shaft secured to the upper end of said rotor.

3. The improvement of claim 1 wherein said slurry of water and pellets is distributed uniformly around the interior of said mesh member as said rotor rotates.

4. The improvement of claim 1 wherein rotor hollow interior portion communicates with a slurry inlet formed at the bottom of said rotor.

5. The improvement of claim 1 wherein centrifugal force created by said slurry of water and pellets emerging from said radially extending passages within said rotor as said rotor rotates assists in forcing water through said mesh member.

6. The improvement of claim 1 wherein said rotor hollow interior portion is cylindrical and coaxial with said rotor.

7. The improvement of claim 1 wherein said rotor has four radially extending passages.

8. A centrifugal pellet dryer comprising:

an outer housing, said housing having a water removal port formed therein;

a generally cylindrical mesh member disposed vertically within said outer housing, said mesh member being formed of material that permits passage of water therethrough but prevents the passage of pellets therethrough;

a vertically disposed rotor with lifters affixed thereto, said rotor journaled for rotation coaxially with said generally cylindrical mesh member to direct pellets upwardly within said mesh member to a pellet exit port formed in said mesh member;

said rotor having a cylindrical hollow interior portion coaxial with said rotor with a plurality of radial passages extending between said rotor cylindrical hollow interior portion and said rotor surface;

a slurry inlet to receive a slurry of pellets and water located on the bottom of said rotor, said slurry inlet communicating with said rotor cylindrical hollow interior portion whereby slurry entering said slurry inlet is conducted through said rotor cylindrical hollow interior portion, through said plurality of radial passages and into a space between said rotor outer surface and said generally cylindrical mesh member.

9. The cylindrical pellet dryer of claim 8 wherein said slurry of water and pellets is distributed uniformly around the interior of said mesh member as said rotor rotates.

10. The cylindrical pellet dryer of claim 8 where centrifugal force created by said slurry of water and pellets emerging from said radially extending passages within said rotor as said rotor rotates assets in forcing water through said mesh member.

\* \* \* \* \*